United States Patent
You

(10) Patent No.: US 7,116,724 B2
(45) Date of Patent: Oct. 3, 2006

(54) METHOD AND SYSTEM FOR TRANSMITTING AND RECEIVING SIGNAL IN MOBILE COMMUNICATION USING A 2-DIMENSIONAL SPACE-TIME INTERLEAVER

(75) Inventor: Cheol Woo You, Seoul (KR)

(73) Assignee: LG Electronics Inc., Seoul (KR)

( * ) Notice: Subject to any disclaimer, the term of this patent is extended or adjusted under 35 U.S.C. 154(b) by 765 days.

(21) Appl. No.: 10/200,211

(22) Filed: Jul. 23, 2002

(65) Prior Publication Data

US 2003/0021355 A1   Jan. 30, 2003

(30) Foreign Application Priority Data

Jul. 27, 2001 (KR) ................. 2001-45438

(51) Int. Cl.
   H04B 7/02 (2006.01)
   H04L 1/02 (2006.01)
(52) U.S. Cl. ............. 375/267; 375/299; 375/347
(58) Field of Classification Search ............. 375/267, 375/299, 347
   See application file for complete search history.

(56) References Cited

U.S. PATENT DOCUMENTS

| | | | | |
|---|---|---|---|---|
| 4,903,240 A | * | 2/1990 | Von Flue | 365/189.02 |
| 5,373,502 A | * | 12/1994 | Turban | 370/441 |
| 6,301,293 B1 | * | 10/2001 | Huang et al. | 375/130 |
| 6,308,294 B1 | * | 10/2001 | Ghosh et al. | 714/751 |
| 6,868,112 B1 | * | 3/2005 | Kim et al. | 375/147 |
| 6,898,248 B1 | * | 5/2005 | Elgamal et al. | 375/259 |

OTHER PUBLICATIONS

Sellathura, "Joint beamformer estimation and co-antenna interference cancellation for TURBO-BLAST" 2001 IEEE International Conference on Acoustics, Speech, and Signal Processing, 2001 Proceedings (ICASSP '01). vol. 4, May 7-11, 2001 pp. 2453-2456.*
Sellathurai, "Further results on diagonal-layered space-time architecture" Vehicular Technology Conference, 2001. VTC 2001 Spring. IEEE VTS 53rd vol. 3, May 6-9, 2001 pp. 1958-1962.*
Sellathurai, "TURBO-BLAST for high-speed wireless communications" Wireless Communications and Networking Conference, 2000. WCNC. 2000 IEEE vol. 1, Sep. 23-28, 2000 pp. 315-320.*
Sellathurai, "A simplified Diagonal BLAST architecture with iterative parallel-interference cancellation receivers"; ICC 2001. IEEE International Conference on Communications, 2001. vol. 10, Jun. 11-14, 2001 pp. 3067-3071.*

* cited by examiner

Primary Examiner—Temesghen Ghebretinsae
Assistant Examiner—Juan Alberto Torres
(74) Attorney, Agent, or Firm—Fleshner & Kim, LLP

(57) ABSTRACT

Disclosed is a signal transmitting and receiving method and system in a mobile communication system provided with a plurality of antennas. The signal transmitting method in the mobile communication system that transmits a signal through a plurality of antennas includes separating by layers and primarily encoding input data for an independent signal generation interleaving in space and time the primarily encoded data of the respective layers, receiving and secondarily encoding the interleaved data, and transmitting the secondarily encoded data through the plurality of antennas.

28 Claims, 14 Drawing Sheets

METHOD AND SYSTEM FOR TRANSMITTING AND RECEIVING SIGNAL IN MOBILE COMMUNICATION USING A 2-DIMENSIONAL SPACE-TIME INTERLEAVER

This application claims the benefit of the Korean Application No. P2001-45438 filed on Jul. 27, 2001, which is hereby incorporated by reference.

BACKGROUND OF THE INVENTION

1. Field of the Invention

The present invention relates to a method and a system for transmitting and receiving a signal in a mobile communication system provided with a plurality of antennas.

2. Discussion of the Related Art

Generally, in the $3^{rd}$ generation and the following wireless communication systems has been used a high-performance channel coding technique using a convolutional code, a turbo code, etc., to maintain a high quality of a transmitted signal. This channel coding technique is for protecting information through a process of inserting redundant check bits into information bits.

Meanwhile, diverse space-time coding techniques for obtaining a transmission diversity using a multi-antenna transmission system have recently appeared. Especially, in a system that uses multiple antennas, researches have been actively made for a layer type space-time coding system for separating information to be transmitted into a plurality of layers and encoding the separated layers in order to simultaneously obtain a channel coding and transmission antenna diversity.

FIG. 1 shows an example of the construction of a conventional transmitter using space-time encoders. FIG. 2 shows another example of the construction of a conventional transmitter using space-time encoders.

Referring to FIGS. 1 and 2, encoding of input data is performed twice through two kinds of encoders 101, 103, 202, and 204 provided in front and rear of interleavers 102 and 203. This encoding process is performed for respective layers to generate signals to be transmitted through a plurality of modulators 104 and 205 to a plurality of antennas. A demultiplexer 201 receives input data and outputs the data to a plurality of encoders 202. A part of encoders 101 and 202 use a channel error correction code such as a convolutional code and so on. The space-time encoders 103 and 204 use an orthogonal code and so on that can increase the independence among the antennas.

The two kinds of encoders (i.e., the encoders and the space-time encoders) used in the above process are independently constructed. This causes decoders for twice decoding in a receiving end to separately operate without exchanging information with each other. That is, the iterative decoding process is not performed.

As described above, according to the conventional multi-antenna transmission system, the channel coding and the space-time code system of the respective layer are not combined with those of other layers, but are independently combined in the corresponding layer only. Thus, the conventional system has the limitations that it cannot obtain an ascending effect through combination of a channel decoder and space diversity by layers.

Also, the members of the next-generation mobile communication system such as the 3GPP for developing the recent $3^{rd}$ generation mobile communication system, adapts the turbo code as a standard, and a diversity structure that performs transmission using two antennas. However, even in this system, the turbo code and the transmission diversity system independently exist without correlation between them, and thus the additional gain through the combination of the two systems cannot be obtained.

SUMMARY OF THE INVENTION

Accordingly, the present invention is directed to a signal transmitting and receiving method and system using multiple antennas that substantially obviates one or more problems due to limitations and disadvantages of the related art.

An object of the present invention is to provide a method and a system for transmitting and receiving a signal in a mobile communication system using multiple antennas suitable for improving the communication quality by properly combining the channel code and the transmission diversity technique.

Another object of the present invention is to provide a method and a system for transmitting and receiving a signal in a mobile communication system using multiple antennas suitable for improving the communication quality without increasing the complexity of a system even if the system environment is changed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting a signal in a mobile communication system that transmits the signal through a plurality of layers comprises primarily encoding input data and separating it by the layers, interleaving in space and time the primarily encoded data of the respective layers, receiving and secondarily encoding the interleaved data, and modulating the secondarily encoded data in time and space and transmitting it through the plurality of antennas.

In other aspect of the present invention, a method for receiving a signal in a mobile communication system that receives the signal through a plurality of layers comprises demodulating the received signal in time and space, separating the demodulated signal into the respective layers, and primarily decoding the separated signal using extrinsic information of the corresponding layer, deinterleaving in space and time the primarily decoded data, secondarily decoding the deinterleaved data, interleaving in space and time the secondarily decoded data, and providing the interleaved data as the extrinsic information, repeating for the predetermined number of times the decoding step, the deinterleaving step, the secondarily decoding step, and the providing step, respectively, and deciding values of the secondarily decoded data generated from the extrinsic information provided by the predetermined number of times.

In another aspect of the present invention, a system for transmitting a signal in a mobile communication system that transmits the signal through a plurality of layers comprises first encoders for separating by layers and primarily encoding input data, an interleaver for interleaving in space and time the primarily encoded data of the respective layers, second encoders for secondarily encoding the interleaved data, time-space modulators for modulating the secondarily encoded data of the respective layers, and antennas for transmitting the modulated data in time and space.

In another aspect of the present invention, an interleaver in a mobile communication system that transmits the signal through a plurality of layers comprises a shift circuit for arranging data bits generated from the same information among the primarily encoded data into the different layers, and one-dimensional interleavers for interleaving in time the arranged bits in the respective layers.

In another aspect of the present invention, a system for receiving a signal in a mobile communication system that receives the signal through a plurality of layers comprises first decoders for demodulating the received signal in time and space, separating the demodulated signal into the respective layers, and primarily decoding the separated signal using extrinsic information of the corresponding layer, a deinterleaver for deinterleaving in space and time the primarily decoded data, second decoders for secondarily decoding the deinterleaved data, an interleaver for interleaving in space and time the secondarily decoded data, and providing the interleaved data as the extrinsic information, and a decision section for deciding combined values of the secondarily decoded data generated from the extrinsic information provided by the predetermined number of times when the first decoders, the deinterleaver, the second decoders, and the interleaver perform their iterative operations for the predetermined number of times.

In another aspect of the present invention, a system for transmitting and receiving a signal in a mobile communication system that transmits and receives a signal through a plurality of layers comprises first encoders for separating by layers and encoding input data for an independent signal generation, a first interleaver for interleaving in space and time the primarily encoded data of the respective layers, a transmitter including second encoders for secondarily encoding an output of the first interleaver, the transmitter transmitting the secondarily encoded data through the plurality of antennas after it applies a code for transmission diversity to the secondarily encoded data, calculators for calculating a degree of error of the data which is received from the transmitter, separated into the respective layers, and then demodulated, storage sections for storing the demodulated data if the degree of error is within a threshold value, combiners for code-combining the data of the same information source read out from the storage sections and re-transmitted data if the degree of error is within the threshold value, and providing the combined data to first decoders as their input, the first decoders for primarily decoding the provided data using extrinsic information of the corresponding layers, a deinterleaver for deinterleaving in space and time the primarily decoded data, second decoders for secondarily decoding the deinterleaved data, a second interleaver for interleaving in space and time the secondarily decoded data, and providing the interleaved data as the extrinsic information, and a receiver including a decision section for deciding combined values of the secondarily decoded data generated from the extrinsic information provided by the predetermined number of times when the first decoders, the deinterleaver, the second decoders, and the second interleaver perform their iterative operations for the predetermined number of times.

In another aspect of the present invention, a signal transmitting and receiving system in a mobile communication system that transmits and receives a signal through a plurality of layers comprises first encoders for separating by layers and encoding input data for an independent signal generation, a first interleaver for interleaving in space and time the primarily encoded data of the respective layers, a transmitter including second encoders for secondarily encoding an output of the first interleaver, the transmitter transmitting the secondarily encoded data through the plurality of antennas after it applies a code for transmission diversity to the secondarily encoded data, a storage section for storing the data which is received from the transmitter, separated into the respective layers, and then demodulated if a degree of error of the data is within a threshold value, decision sections for deciding whether the demodulated data is newly transmitted data or re-transmitted data, combiners for code-combining a previously received data of the same information source read out from the storage section and the re-transmitted data if the modulated data is the re-transmitted data as a result of decision, and providing the combined data to first decoders as their input, the first decoders for primarily decoding the provided data using extrinsic information of the corresponding layers, a deinterleaver for deinterleaving in space and time the primarily decoded data, second decoders for secondarily decoding the deinterleaved data, a second interleaver for interleaving in space and time the secondarily decoded data, and providing the interleaved data as the extrinsic information, and a receiver including a decision section for deciding combined values of the secondarily decoded data generated from the extrinsic information provided by the predetermined number of times when the first decoders, the deinterleaver, the second decoders, and the second interleaver perform their iterative operations for the predetermined number of times.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention relates to a method of effectively combining the channel coding and the transmission diversity technique to improve the error performance in a system using multiple antennas.

Especially, the present invention is directed to the improvement of the transmission diversity performance without increasing the complexity of the system even if the system environment such as the number of antennas, increase of layers, etc., is changed.

For this, the present invention performs at least twice encoding and decoding, respectively. The encoding and decoding are performed for each layer. The respective layer means a spacial path through which data is transmitted. That is, it means a transmission path through which a radio frame converted from the data is transmitted.

Figure 3:
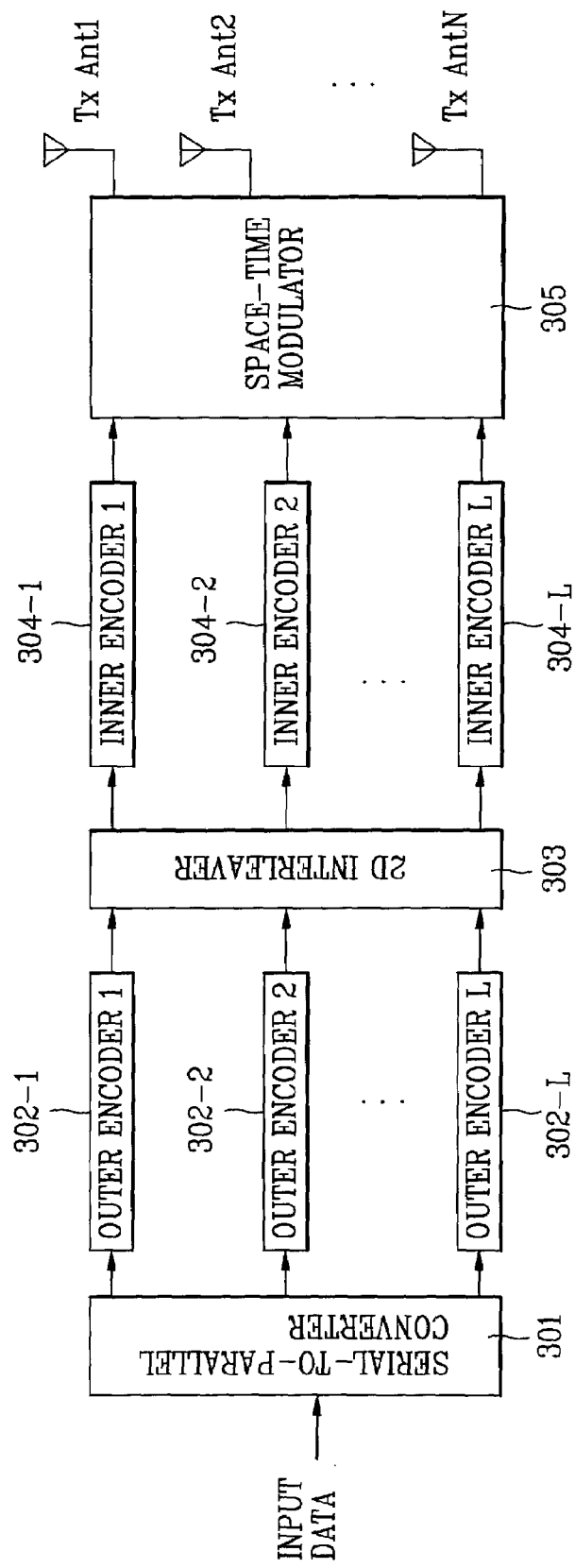
FIG. 3 is a view illustrating the construction of a serial concatenated space-time code transmitter according to an embodiment of the present invention.
Figure 4:
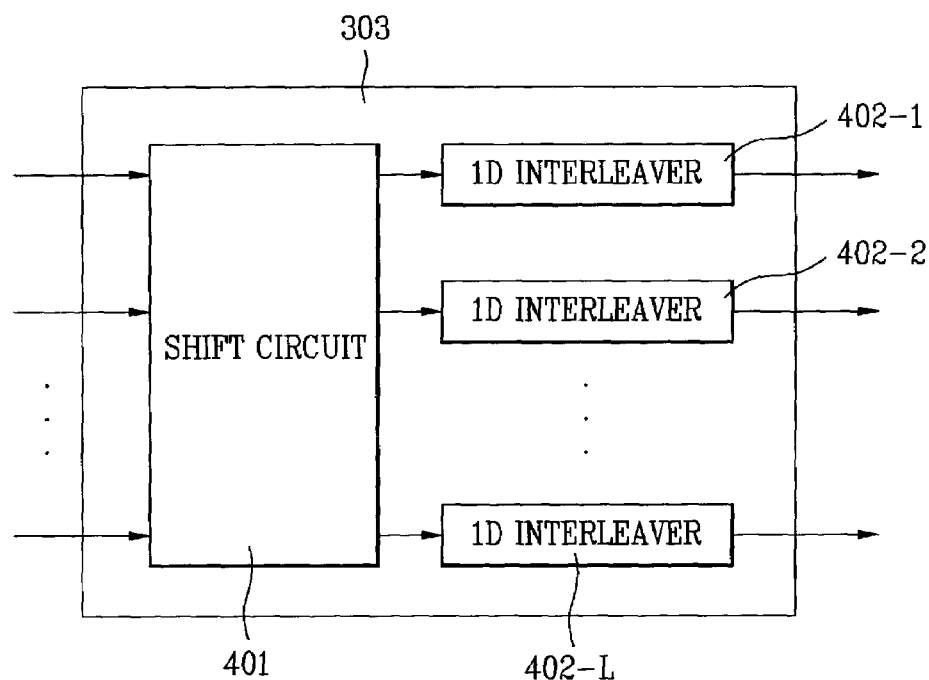
FIG. 4 is a view illustrating the construction of a two-dimensional interleaver implemented by a shift circuit illustrated in FIG. 3.
Figure 5:
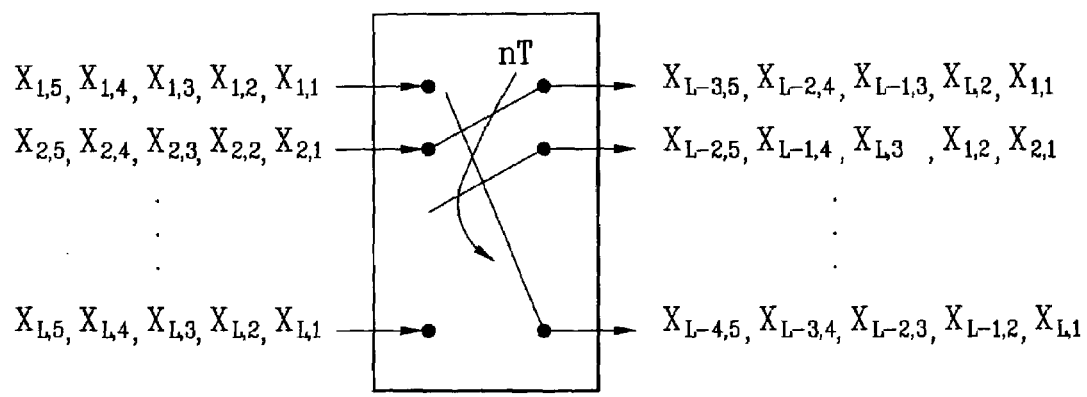
FIG. 5 is a view explaining the operational principle of the shift circuit illustrated in FIG. 4.

FIG. 3 is a view illustrating the construction of a serial concatenated space-time code transmitter according to an embodiment of the present invention. FIG. 4 is a view illustrating the construction of a two-dimensional interleaver implemented by a shift circuit illustrated in FIG. 3. FIG. 5 is a view explaining the operational principle of the shift circuit illustrated in FIG. 4.

As shown in FIG. 3, the multi-antenna transmission system according to the present invention includes a serial-to-parallel converter 301 for converting a serial input sequence into parallel sequences for each layer, outer encoders 302 for encoding the parallel sequences, a two-dimensional (2D) interleaver 303 for interleaving the encoded sequences in space and time, inner encoders 304 for re-encoding the interleaved sequences, and a space-time modulator 305 for modulating the re-encoded sequences.

According to the construction including the outer encoders 302, the 2D interleaver 303, and the inner encoders 304, the interleaver is placed between two kinds of convolutional encoders. This construction is considered as a kind of turbo encoder suitable for the transmission diversity.

The operation of the system as constructed above will be explained.

The serial sequence of data to be transmitted is separated into L layers in a manner that it is converted into the parallel sequences by the serial-to-parallel converter 301, and then inputted to the outer encoders 302 of the L layers to be primarily encoded. At this time, a channel code (hereinafter referred to as an outer code) used in the outer encoders 302 uses a code system having various structures, and can be simply implemented using the convolutional code.

The primarily encoded sequences are interleaved in space and time by the 2D interleaver 303, and then secondarily encoded by the inner encoders 304. If the interleaver of FIG. 4 is used as the two-dimensional interleaver(303), the primarily encoded sequences are arranged into a different layer by a shift circuit 401 illustrated in FIG. 4, and then interleaved in time by a one-dimensional (1D) interleaver 402. Hereinafter, the channel code used in the inner encoders 304 is called an inner code.

In the 2D interleaver 303, the two dimensions mean the space and time dimensions, and the space dimension is separated into a plurality of layers. Independent signals are generated through the signal processes of the respective layers. At this time, in order to obtain the space diversity at maximum in the respective layers, the number N of transmission antennas should be larger than or equal to the number L of layers.

Also, diverse interleaving types may be used in the 2D interleaver 303, and the interleaving performance is greatly improved due to the characteristic of a general concatenated code if an interleaver having a random characteristic is used.

As described above, in case of using the 2D random interleaver, the present invention has a random characteristic not only on a time axis but also on a space axis of respective layer.

In the present invention, an interleaver having the construction illustrated in FIG. 4 is used as the 2D random interleaver. This interleaver 303 includes a shift circuit 401, and L one-dimensional (1D) interleavers 402 having the same structure.

Since the interleaver(303) includes the 1D interleavers 402 having one interleaver pattern and the shift circuit(401) that performs a simple modulo-L operation, the system complexity is reduced. On the contrary, a deinterleaver for performing a reverse process of the interleaver is provided in a receiving end.

Also, in case that the receiving end receives and decodes the signals as generated above, the same deinterleaving process is performed by layers, and thus a time delay can be reduced.

As shown in FIG. 5, according to the 2D interleaver 303, two adjacent symbols encoded by the same outer code, i.e., symbols encoded by the same information bits do not exist simultaneously in the same layer, and if L is above a constraint length of the outer code, the symbols encoded by the same information bits are separated into different layers, respectively. This causes the correlation between the outer code and the inner code to be reduced.

In FIG. 5, T denotes a transmission symbol period, and $X_{ij}$ denotes a symbol generated on the i-th layer at the j-th time.

Also, the sequences arranged to the different layers by the 2D interleaver 303 are interleaved in time through the 1D interleaver 402 provided in the interleaver 303, and thus the input symbols of the inner encoders 304 have a very random characteristic from a viewpoint of the inner code. Also, when the receiving end decodes the signal as generated above, burst errors successively generated in the inner code is prevented from propagating to the outer code.

Meanwhile, it is profitable to use the convolutional code as the channel code used in the inner encoders 304, and in case of using the same structure as the channel code used in the outer encoders 302, no additional hardware complexity is increased.

The secondarily encoded sequences of L layers are transmitted to the receiving end through N transmission antennas after being processed through a space-time modulator 305 of diverse types. This space-time modulator 305 modulates the secondarily encoded sequences of L layers, respectively.

The space-time modulator 305 is a common name of a modulator that performs a modulation in consideration of the time dimension and the space dimension.

Figure 6:
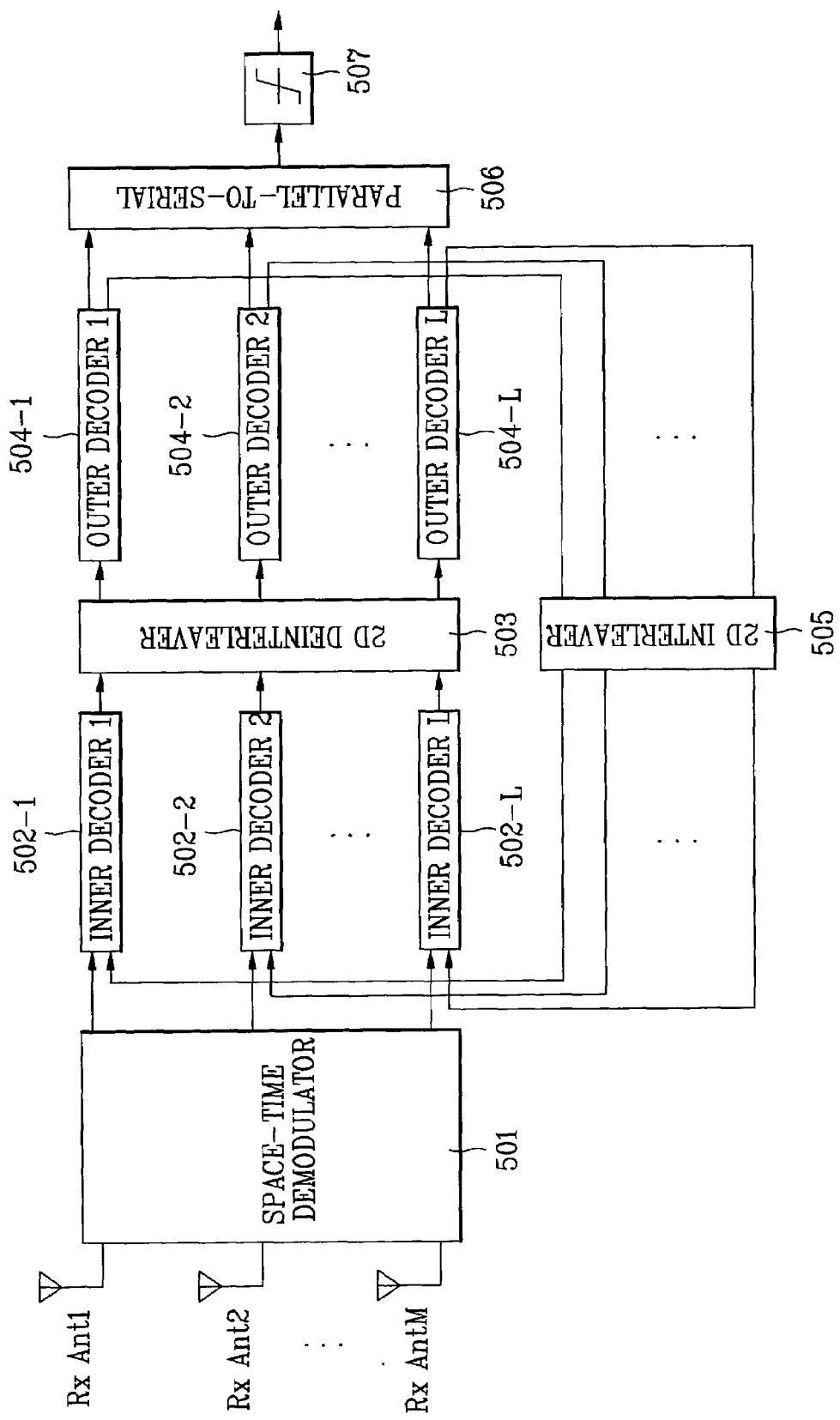
FIG. 6 is a view illustrating the construction of a serial concatenated space-time code receiver according to an embodiment of the present invention.
Figure 7:
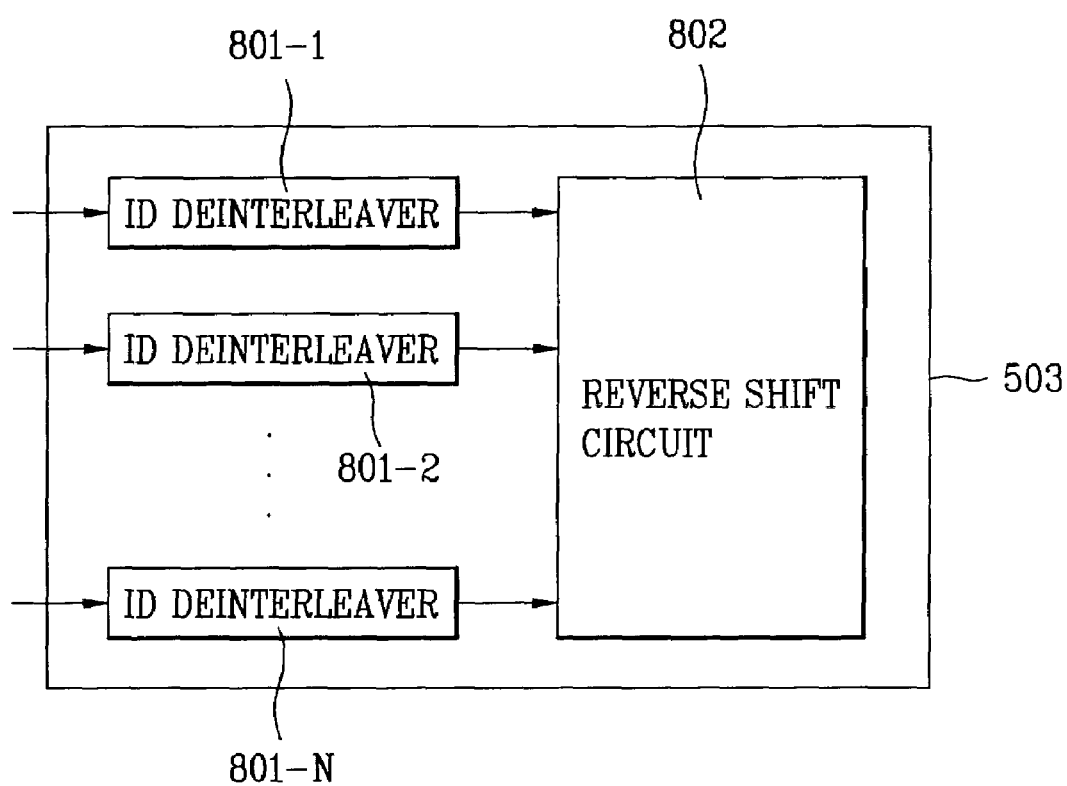
FIG. 7 is a view illustrating the construction of a two-dimensional deinterleaver illustrated in FIG. 6.

FIG. 6 is a view illustrating the construction of a serial concatenated space-time code receiver according to an embodiment of the present invention. FIG. 7 is a view illustrating the construction of a two-dimensional deinterleaver illustrated in FIG. 6.

Referring to FIG. 6, the serial concatenated space-time code receiver according to an embodiment of the present invention includes inner decoders 502 for primarily decoding the sequences, which were received, separated into the respective layers, and then demodulated, using extrinsic information, a two-dimensional (2D) deinterleaver 503 for deinterleaving the primarily decoded sequences in space and time, outer decoders 504 for secondarily decoding the deinterleaved sequences, a two-dimensional (2D) interleaver 505 for interleaving the secondarily decoded sequences in space and time for the predetermined number and providing the interleaved sequences as the extrinsic information, a parallel-to-serial converter 506 for converting the parallel sequences outputted from the outer decoders and secondarily decoded as many as (the predetermined number) into a serial sequence, and a decision section 507 for deciding a signal value of the serial sequence.

When the inner decoders 502, the 2D deinterleaver 503, the outer decoders 504, and the 2D interleaver 505 performs their iterative operation for the predetermined number of times, outputs of the outer decoders 504 generated from the extrinsic information provided from the 2D interleaver are converted into the serial sequence by the parallel-to-serial converter 506, and the serial sequence is then inputted to the decision section 507.

That is, the construction including the inner decoders 502, the 2D deinterleaver 503, the outer decoders 504, and the 2D interleaver 505 is for performing an iterative decoding process that receives an extrinsic information and outputs a probability value. This construction is considered as a kind of turbo decoder suitable for the transmission diversity.

The received signal processing according to the above-described construction will be explained.

The sequences received through M antennas are separated into L layers, and then demodulated by a 2D space-time demodulator 501.

Here, the space-time demodulator 501 is a common name of a demodulator that performs a decoding in consideration of the space dimension and the time dimension.

The received demodulated sequences are primarily decoded through the inner decoders 502. The inner decoder 502 is a common name of a decoder that outputs sequences having soft decision values such as a Viterbi decoder, Maximum a posteriori decoder, etc.

Figure 1:
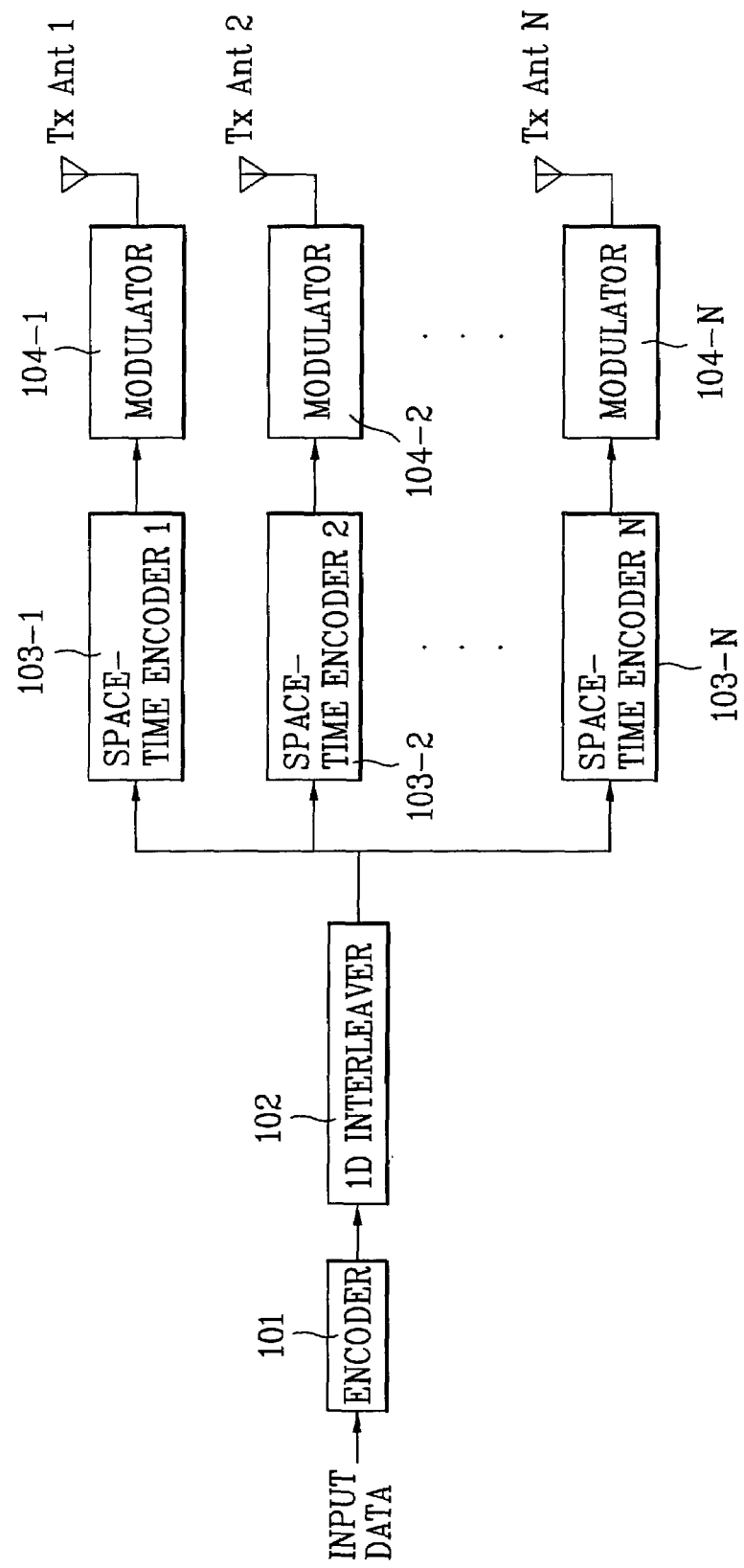
FIG. 1 is a view illustrating an example of the construction of a conventional transmitter using space-time encoders.
Figure 2:
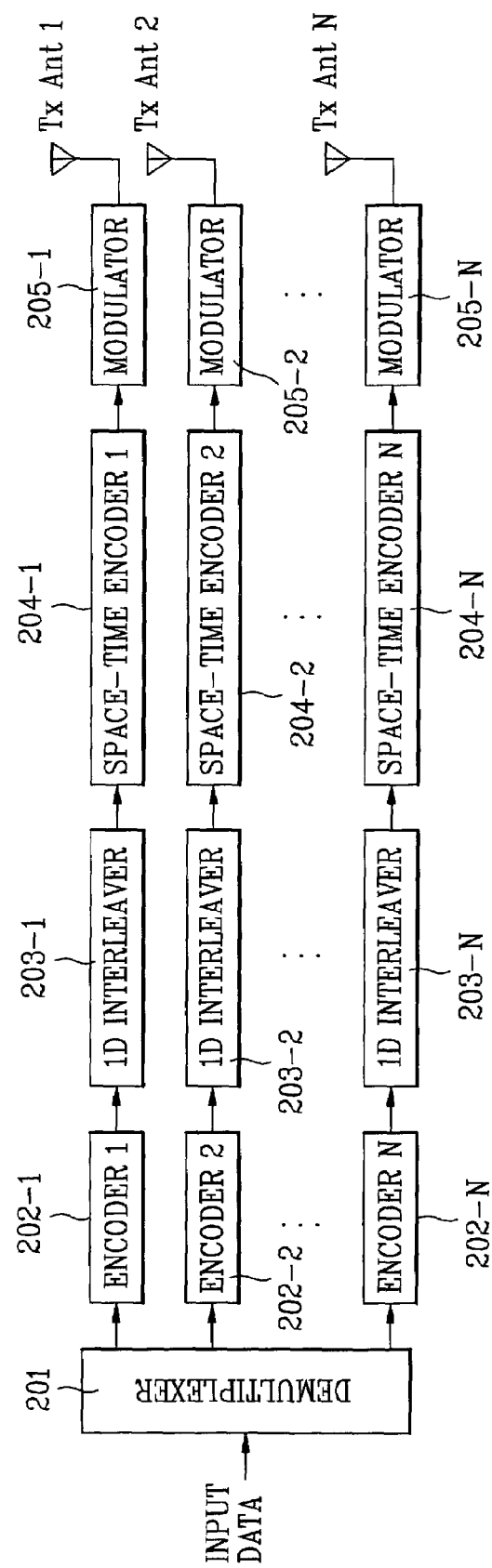
FIG. 2 is a view illustrating another example of the construction of a conventional transmitter using space-time encoders.

The primarily decoded sequences are deinterleaved in time and space through the 2D deinterleaver 503. That is, the 2D deinterleaver 503 performs a reverse operation of the 2D interleaver 303 as shown in FIG. 1.

For this, the 2D deinterleaver 503, as shown in FIG. 7, includes 1D deinterleavers 801 for deinterleaving in time the sequences primarily decoded by the inner decoders 502 by layers, and a reverse shift circuit 802 for combining the symbols generated from the same information bits among the deinterleaved sequences into the same layer.

The soft decision decoder that is the outer decoder (i.e., soft decision decoder) 504 having the same construction as the inner decoder 502 secondarily decodes the sequences deinterleaved in space and time.

In the same manner as in the transmitting end, the inner decoders 502 and the outer decoders 504 perform in order the decoding with respect to the error correction channel codes which are called the inner code and the outer code.

Also, it is more efficient that the constraint length of the inner decoders 502 and the outer decoders 504 has a value smaller than the number of receiving antennas.

The secondarily decoded sequences are interleaved in space and time by the 2D interleaver 505, and then provided to the inner decoders 502 as the extrinsic information. Accordingly, the iterative decoding becomes possible.

The final soft decision value outputted from the parallel-to-serial converter 506 is subject to a hard decision by the decision section 507.

Figure 8:
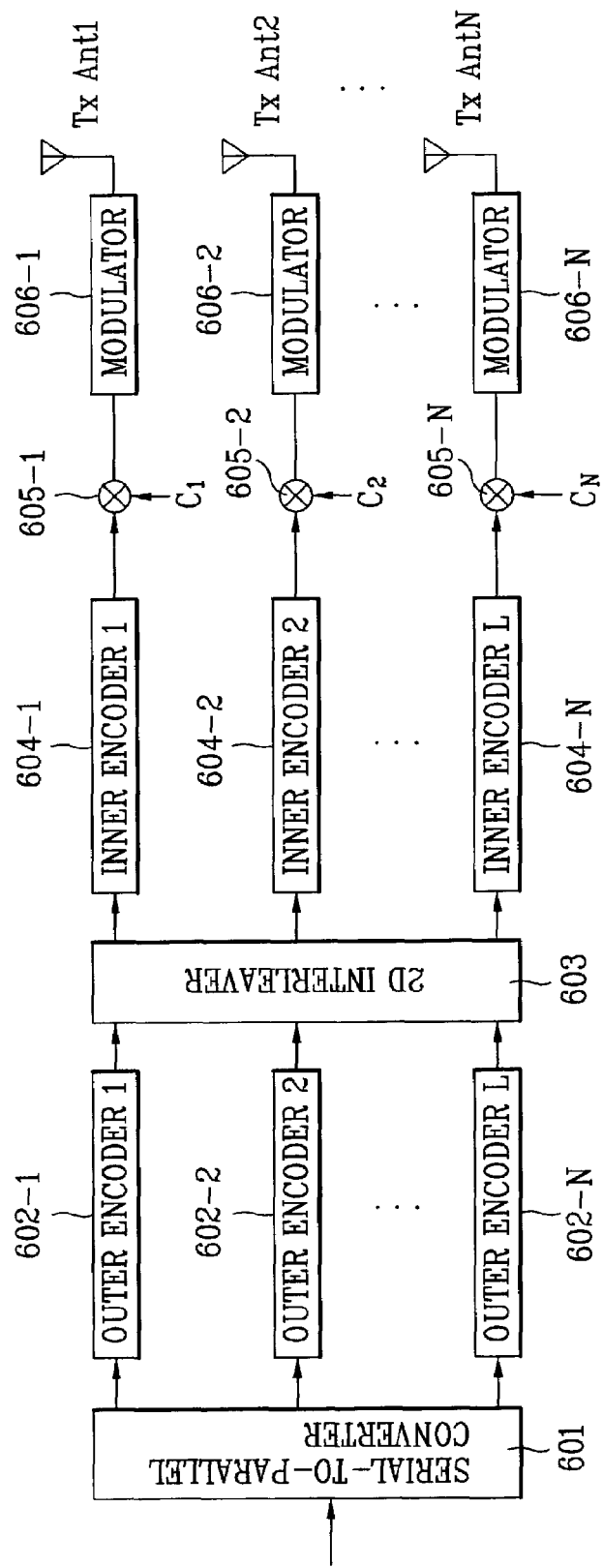
FIG. 8 is a view illustrating the construction of a serial concatenated space-time code transmitter according to another embodiment of the present invention.

The present invention can be used in all the systems which perform the signal transmission and reception using multiple antennas, and especially in case of a CDMA system, an orthogonal transmission diversity (OTD) can be used, the application of which is illustrated in FIG. 8.

FIG. 8 is a view illustrating the construction of a serial concatenated space-time code transmitter according to another embodiment of the present invention.

As shown in FIG. 8, the transmitter according to the present invention further includes spreaders or scramblers 605-1 to 605-N for spreading or scrambling the output signals of the respective layers using the sequences such as pseudo noise codes, gold codes, and walsh codes after the number of layers is set to be equal to or smaller than the number N of transmission antennas. In this case, the receiver is constructed as shown in FIG. 9.

The basic operational principle of other parts of the construction of FIG. 8 is equal to that illustrated in FIG. 3. Here, $C_N$ denotes a spreading or scrambling sequence for the N-th antenna, and has a different value in accordance with N.

Figure 9:
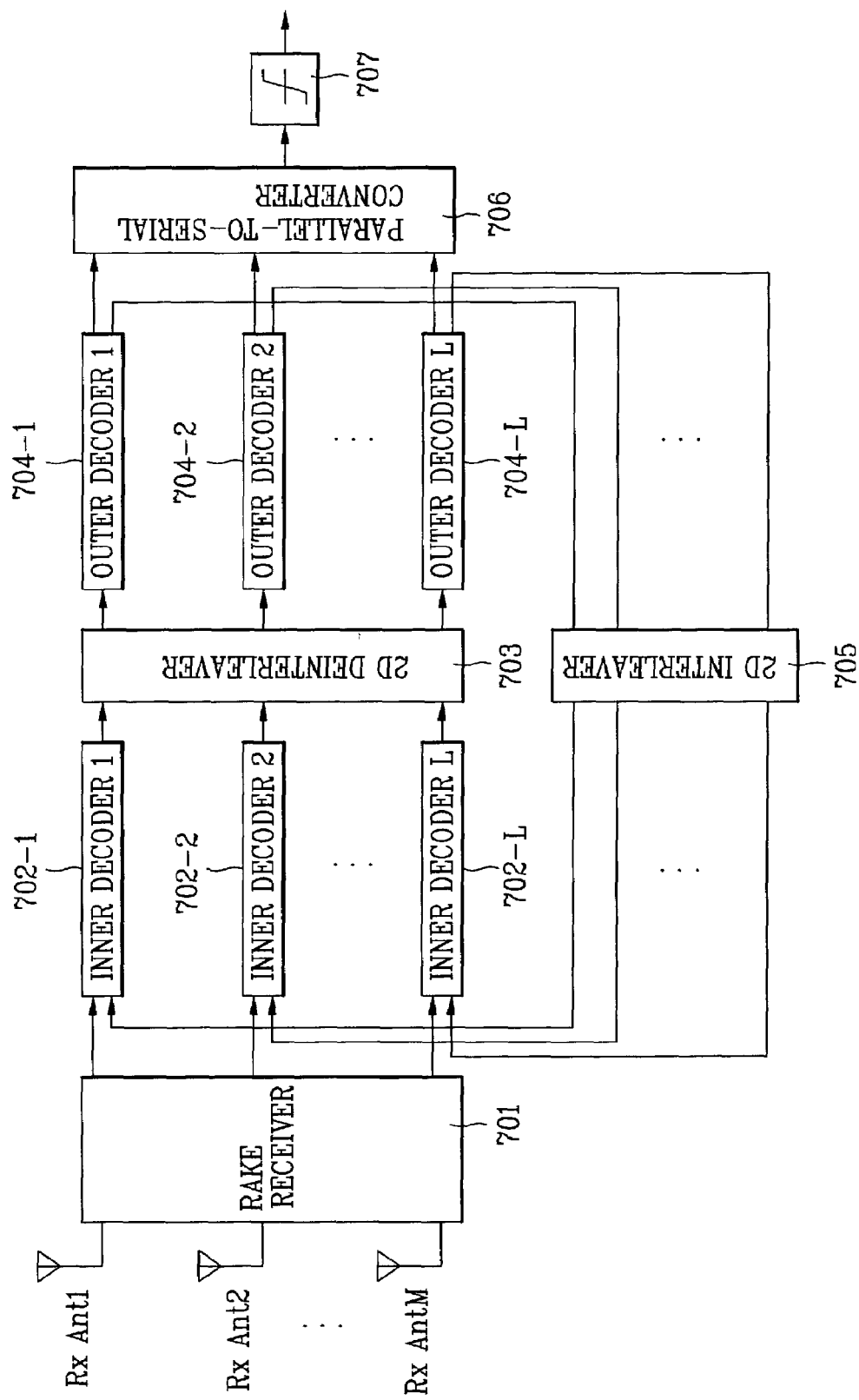
FIG. 9 is a view illustrating the construction of a serial concatenated space-time code receiver according to another embodiment of the present invention.
Figure 10:
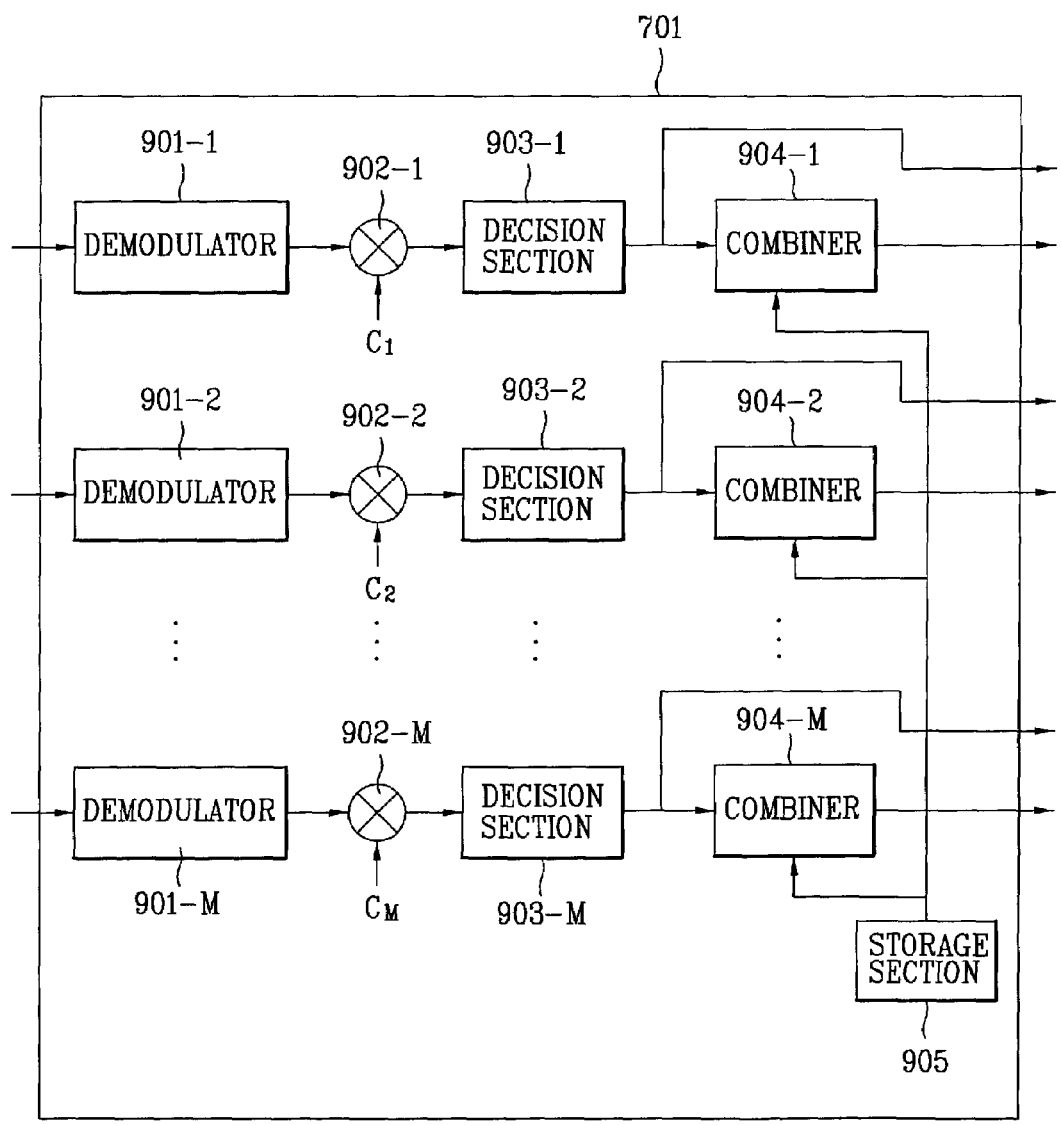
FIG. 10 is a view illustrating the construction of a rake receiver illustrated in FIG. 9.

FIG. 9 is a view illustrating the construction of a serial concatenated space-time code receiver according to another embodiment of the present invention. FIG. 10 is a view illustrating the construction of a rake receiver illustrated in FIG. 9.

The signals transmitted by the construction of FIG. 8 are separated into the respective layers, demodulated and despread(or descrambled) by demodulators 901 and despreaders 902 of the rake receiver 701.

During the dispreading(or descrambling) process, the pseudo noise code or gold code is used in the same manner as the spreading(or descrambling) process of FIG. 8.

The rake receiver 701 calculates the degree of error of the transmitted signal, directly processes the signal where an error below a first threshold value is generated, and provides the signal as the input sequence of the inner decoders 702.

The rake receiver 701 stores the signal where an error between the first threshold value and a second threshold value is generated in a storage section 905, and requests the re-transmission of the signal to the transmitting end. The signal transmitted according to the request includes additional redundancy codes of the transmitted signal.

The rake receiver 701 does not store the signal where an error over the second threshold value is generated in the storage section 905, but requests the re-transmission of the corresponding signal to the transmitting end. The signal transmitted according to the request is processed in the same manner as a newly transmitted signal.

Accordingly, decision sections 903 of the rake receiver 701 respectively decide whether the despread(or descrambled) signal of the respective layer is a newly transmitted signal or re-transmitted signal.

If it is decided that the signal is the re-transmitted signal, combiners 904 of the rake receiver 701 code-combine the despread(or descrambled) signals of the respective layers and the previous despread(or descrambled) signals which include the same information as the despread(or descrambled) signals, and provide the combined signals as the input sequences of the inner decoders 702.

FIGS. 11 to 15 are graphs illustrating bit error rates according to the number of antennas and the channel environment in case that the multi-antenna transmission system according to the present invention is used.

In FIGS. 11 to 14, it is assumed that in the environment, the size of the 1D interleaver is of 256, the number of receiving antennas is 1, the spreading rate is 32 chips per transmission symbol, a band-spreading is performed using a gold code having a length of 256, 4 symbols are simultaneously transmitted for all the cases, and three interference signals exist for each layer signal. Here, Tx m means the number of transmission antennas.

Figure 11:
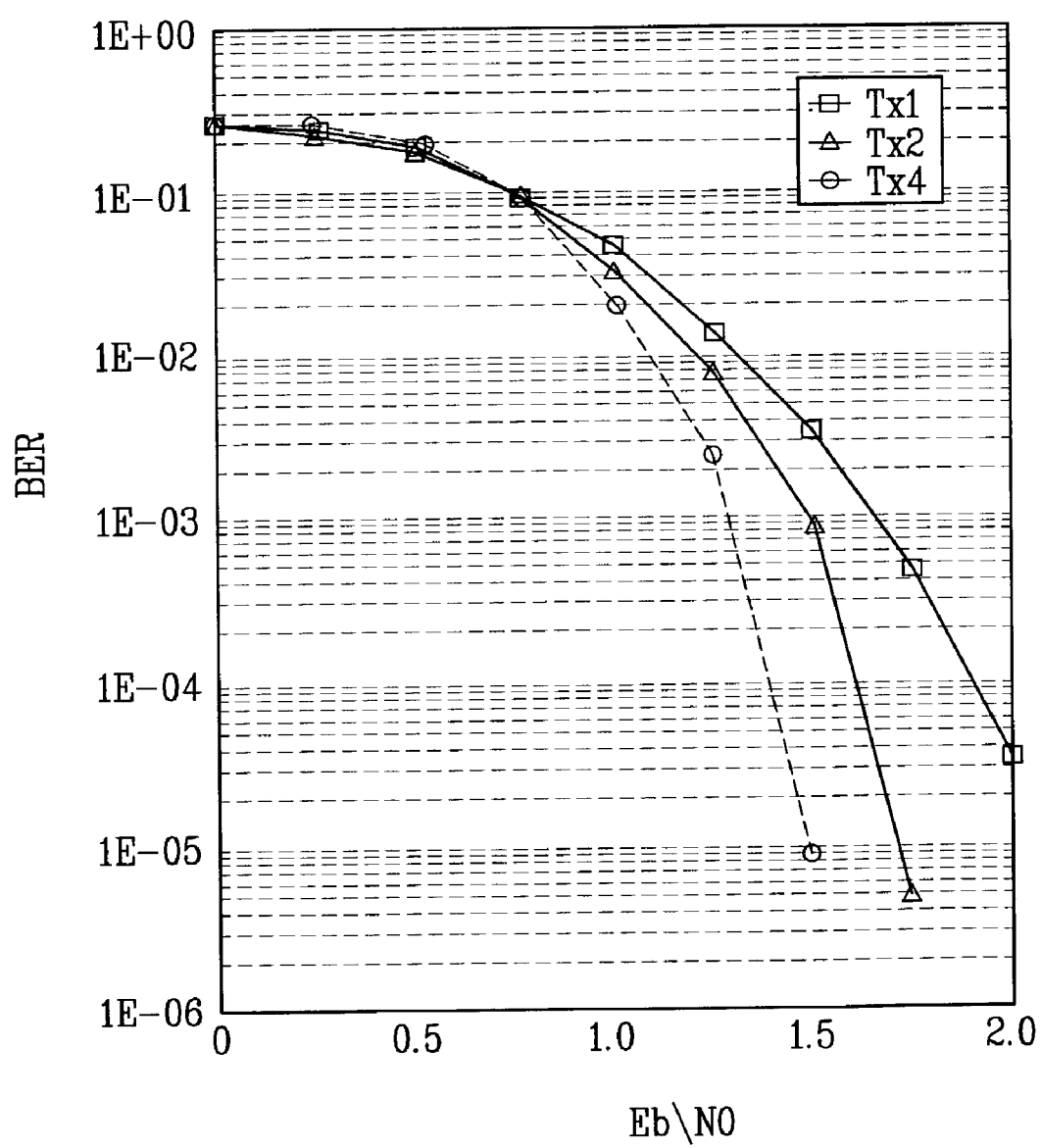
FIG. 11 is a graph illustrating a bit error rate in an AWGN channel environment according to the present invention.

FIG. 11 is a graph illustrating a bit error rate in the AWGN channel environment according to the present invention.

As shown in FIG. 11, it can be confirmed that as the number of antennas is increased, the error performance is improved.

Figure 12:
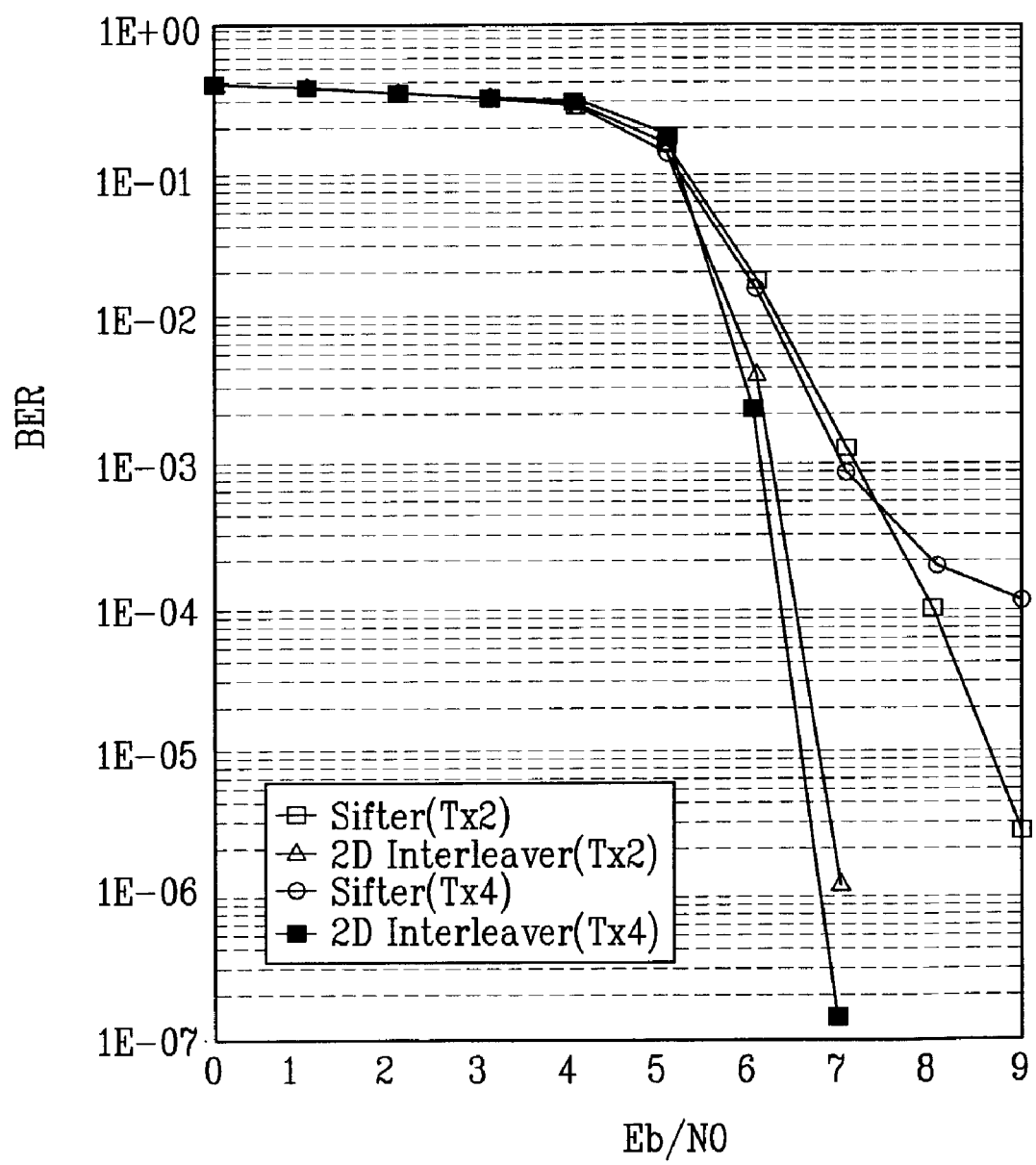
FIG. 12 is a graph illustrating a bit error rate according to the kind of a two-dimensional interleaver according to the present invention.

FIG. 12 is a graph illustrating a bit error rate according to the kind of a 2D interleaver according to the present invention.

In FIG. 12, the performance of the 2D random interleaver is compared with that of the 2D interleaver having the modulo-L shift structure. The performance of the 2D random interleaver appears to be almost similar to that of the 2D interleaver having the modulo-L shift structure.

Here, "shifter" means the case that the 2D interleaver illustrated in FIG. 4 is used, and "2D interleaver" means the two-dimensional random interleaver.

That is, it can be confirmed that the 2D interleaver (called "shifter") has almost the same performance as the 2D random interleaver having a big complexity in implementation.

Figure 13:
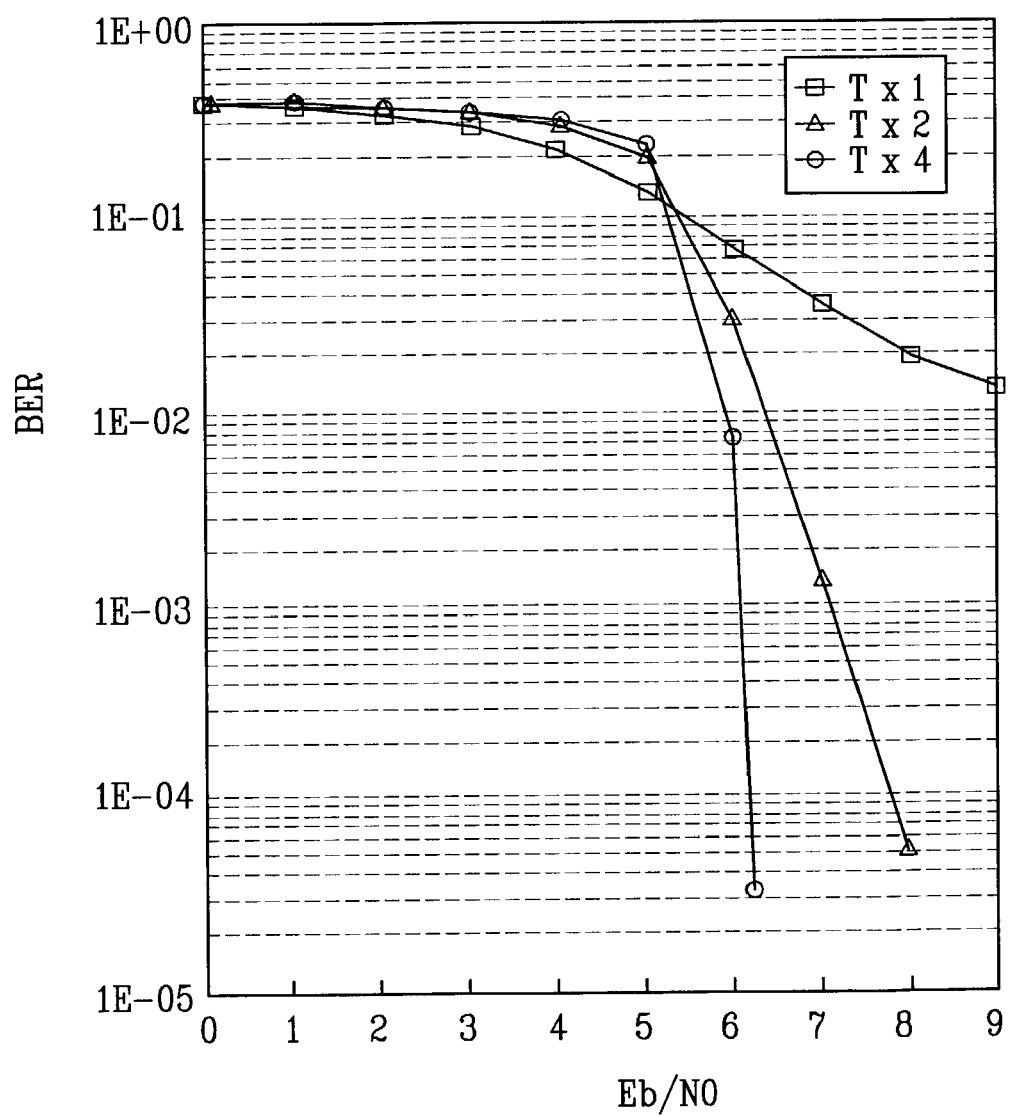
FIG. 13 is a graph illustrating a bit error rate in case that a fading rate is 0.001 according to the present invention.

FIG. 13 is a graph illustrating a bit error rate in case that a fading rate is 0.001 according to the present invention.

Figure 14:
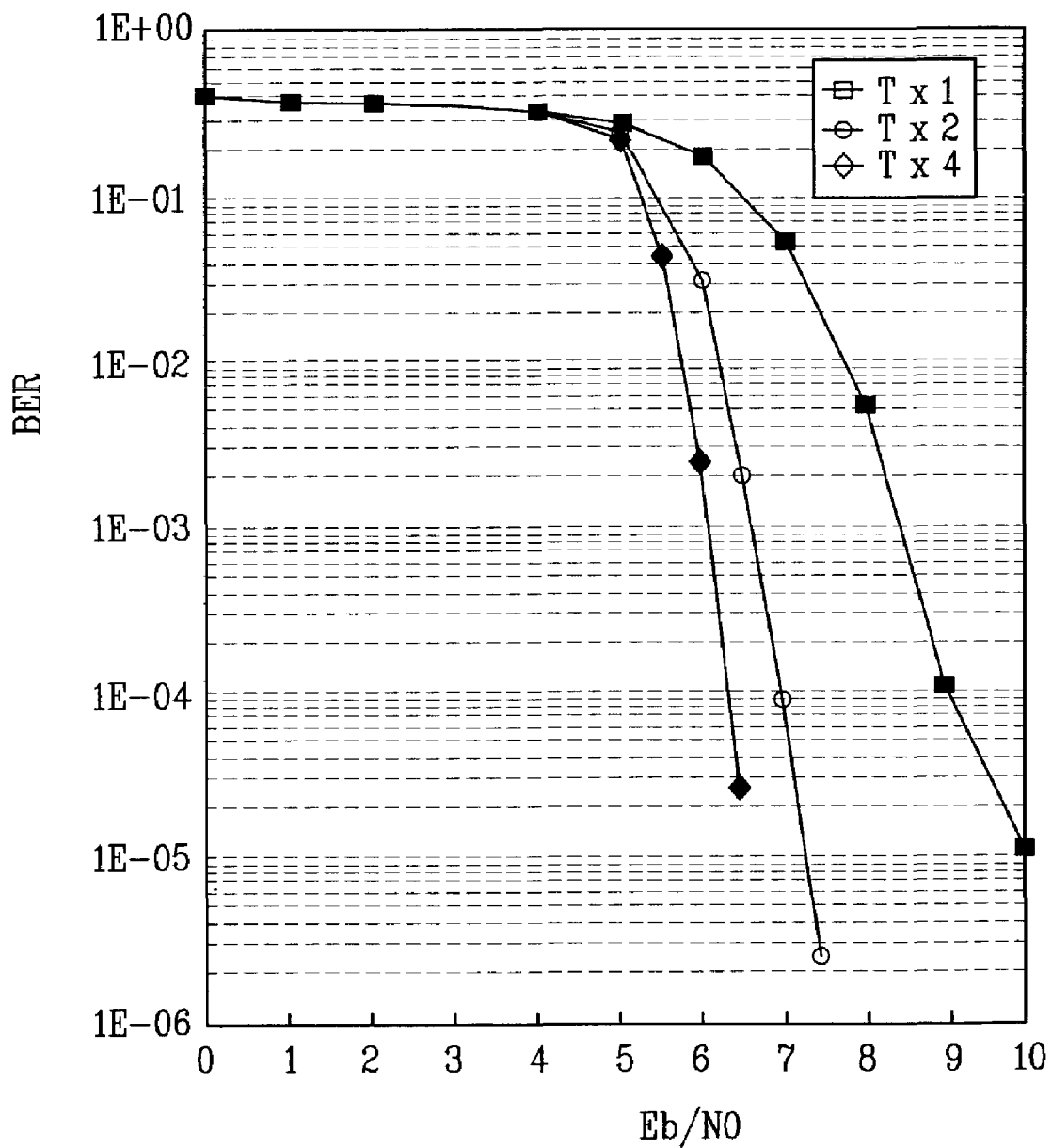
FIG. 14 is a graph illustrating a bit error rate in case that a fading rate is 0.003 according to the present invention.

FIG. 14 is a graph illustrating a bit error rate in case that a fading rate is 0.003 according to the present invention.

FIGS. 13 and 14 show the performance according to the change of the fading rate of the channel due to the Doppler phenomenon. As the fading rate is lowered, the performance according to the increase of the number of antennas is greatly improved.

Figure 15:
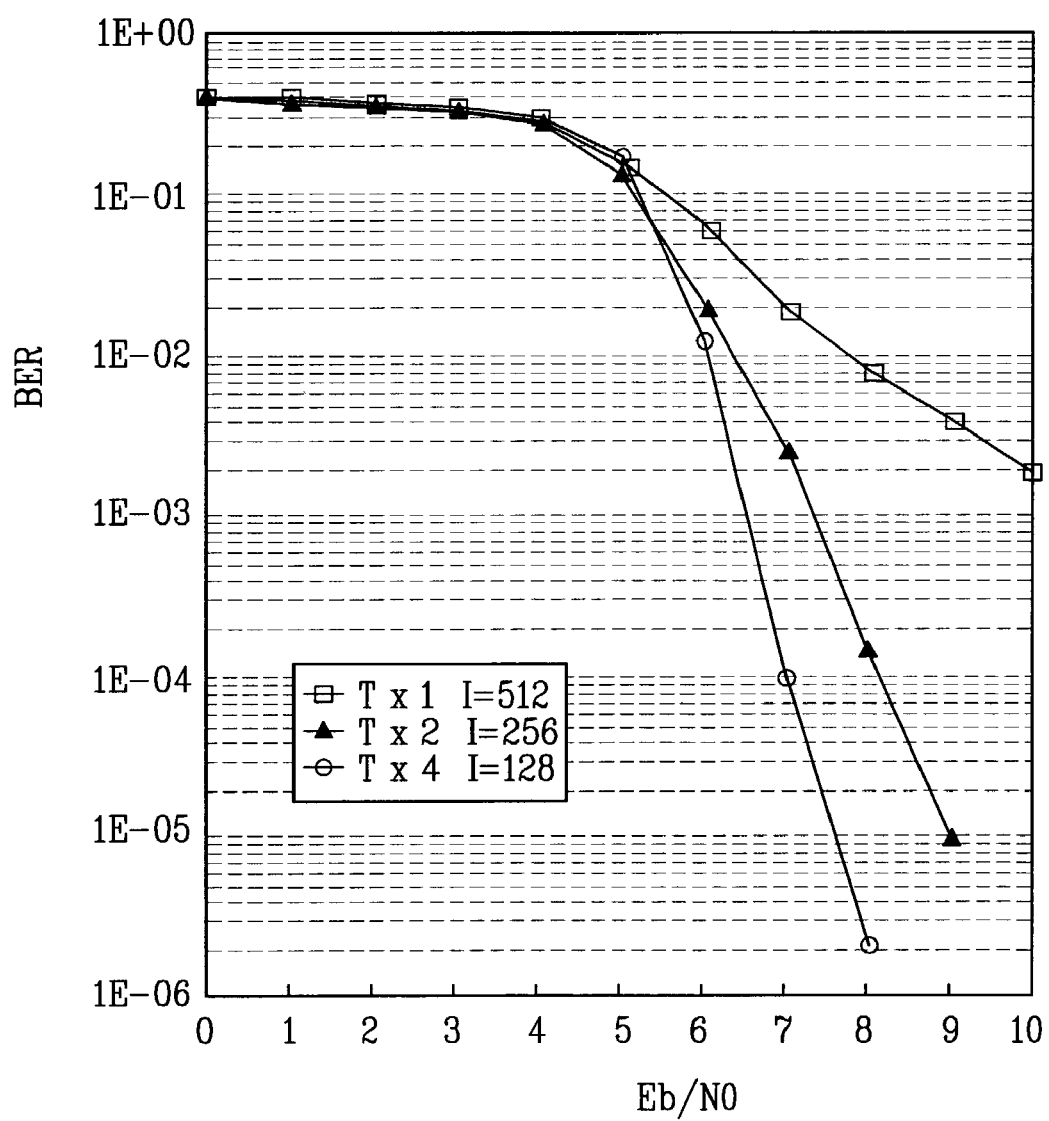
FIG. 15 is a graph a bit error rate according to the change of the number of antennas and the size of an interleaver according to the present invention.

FIG. 15 is a graph a bit error rate according to the change of the number of antennas and the size of an interleaver according to the present invention.

FIG. 15 shows the performance comparison according to the whole size of the used interleaver. It is considered that the interleaver of 512 is used if the number of antennas is 1. In this case, it can be recognized that as the number of antennas is increased, the performance is greatly improved.

Here, "I" means the size of the 1D interleaver.

In order to maximize the performance of the channel code and the space diversity effect in the layer type space-time code system of the present invention, the concatenated code is used on the respective layers of the transmitting end so that the receiving end can perform the iterative decoding.

The concatenated code system encodes the same information into various types using the interleaver, and simultaneously transmits the encoded information of various types. This system has a very superior performance by the iterative decoding of the receiving end. This code may be classified into a parallel concatenated code (i.e., turbo code) and a serial concatenated code.

The serial concatenated code system is a system where the interleaver is positioned between two convolutional encoders, and is very advantageous to be applied to the layer type space-time code system.

As described above, since the present invention uses the same structure by layers and implements the antenna diversity using a simple shift structure, the extension can be easily performed even if the number of layers is increased, and the reception bit error performance can be improved in the multi-antenna transmitting and receiving system.

Second, since the present invention improves the bit error performance of the received signal, gains of the transmission power, system performance, user capacity, etc., are produced in comparison to the existing system.

Third, the present invention combines the space and time diversity from a viewpoint of the channel coding, and thus a desired performance can be obtained even if the length of the 1D interleaver that generally determines the performance of the turbo code is reduced. Accordingly, the time delay and the complexity due to the interleaver can be reduced, and the allocation of slots or frames in a time division transmission system becomes smooth due to the reduction of the transmission unit.

Also, the present invention can be used for the improvement of the bit error performance of all communication systems which use N transmitting antennas and M receiving antennas, and the performance is greatly improved through the iterative used of the same structure without increase of the hardware complexity according to the increase of the layers, thereby obtaining the gains such as the performance of the system, the increase of the capacity, etc.

Also, the present invention can be smoothly applied to diverse types of multi-antenna transmission systems according to the space-time modulation system, and the additional space diversity effect can be expected.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for transmitting a signal through a plurality of layers in a mobile communication system comprising:
   primarily encoding input data in the respective layers;
   interleaving in space and time the primarily encoded data of the respective layers;
   secondarily encoding the interleaved data; and
   space-time modulating the secondarily encoded data and transmitting the modulated data through a plurality of antennas.

2. The signal transmitting method of claim 1, wherein the primary and secondary encoding is performed by a convolutional code.

3. The signal transmitting method of claim 1, wherein the interleaving step further comprises:

arranging data bits generated from the same information among the primarily encoded data into the different layers; and interleaving in time the arranged bits in the respective layers.

4. The method of claim 1, wherein the step of modulating is performed by space-time modulation method.

5. The method of claim 1, further comprising despreading or scrambling the secondarily encoded data with codes for a transmission diversity.

6. A method for receiving a signal through a plurality of layers in a mobile communication system comprising:

demodulating the received signal in time and space, separating the demodulated signal into the respective layers, and primarily decoding the separated signal using extrinsic information of the corresponding layer;

deinterleaving in space and time the primarily decoded signal;

secondarily decoding the deinterleaved signal;

interleaving in space and time the secondarily decoded signal, and providing the interleaved signal as the extrinsic information;

repeating for the predetermined number the decoding step, the deinterleaving step, the secondarily decoding step, and the providing step, respectively; and deciding values of the secondarily decoded signal generated from the extrinsic information provided by the predetermined number of times.

7. The method of claim 6, wherein at the deciding step, a hard decision of a combined value is performed.

8. The method of claim 6, wherein the primary and secondary decoding is performed using a convolutional code.

9. The method of claim 6, wherein the deinterleaving step comprises:

deinterleaving in time the primarily decoded data, respectively; and combining data bits generated from the same information among the deinterleaved data into the same layer.

10. The method of claim 6, wherein the interleaving step comprises:

arranging data bits generated from the same information among the secondarily decoded data into the different layers; and interleaving in time the arranged data, respectively.

11. The method of claim 6, wherein the received signal is demodulated by a rake receiver using a combining method of time-space diversity if an orthogonal transmission diversity is applied to the received signal.

12. A system for transmitting a signal in a mobile communication system that transmits the signal through a plurality of layers comprising:

first encoders for primarily encoding input data in respective layers;

an interleaver for interleaving in space and time the primarily encoded data of the respective layers;

second encoders for secondarily encoding the interleaved data;

modulators for modulating the secondarily encoded data of the respective layers; and a plurality of antenna for transmitting the signal.

13. The system of claim 12, wherein the first and the second encoders use a convolutional code.

14. The system of claim 12, the modulators is applied by the space-time modulation method.

15. The system of claim 13, further comprising a spreader for spreading or a scrambler for scrambling the secondarily encoding data by using transmission diversity codes.

16. A system for receiving a signal through a plurality of layers in a mobile communication system comprising:

first decoders for demodulating the received signal in time and space, separating the demodulated signal into the respective layers, and primarily decoding the separated signal using extrinsic information of a corresponding layer;

a deinterleaver for deinterleaving in space and time the primarily decoded signal;

second decoders for secondarily decoding the deinterleaved signal;

an interleaver for interleaving in space and time the secondarily decoded signal, and providing the interleaved signal as the extrinsic information; and a decision section for deciding combined values of the secondarily decoded signal generated from the extrinsic information provided by a predetermined number of times when the first decoders, the deinterleaver, the second decoders, and the interleaver perform their iterative operations for the predetermined number of times.

17. The system of claim 16, further comprising a parallel-to-serial converter for converting the secondarily decoded data values generated from the extrinsic information provided by the predetermined number of times into a serial sequence, and providing the serial sequence to the decision section.

18. The system of claim 17, wherein the decision section performs a hard decision of the provided serial sequence.

19. The system of claim 16, wherein the first and the second decoders use a convolutional code.

20. The system of claim 16, wherein the deinterleaver comprises:

one-dimensional deinterleavers for deinterleaving in time the primarily decoded data, respectively; and a reverse shift circuit for combining data bits generated from the same information among the deinterleaved data into the same layer.

21. The system of claim 20, wherein the reverse shift circuit performs a modulo operation in accordance with the number of the layers.

22. The system of claim 16, wherein the interleaver comprises:

a shift circuit for arranging data bits generated from the same information among the secondarily decoded data into the different layers; and one-dimensional interleavers for interleaving in time the arranged data, respectively.

23. The system of claim 22, wherein the shift circuit performs a modulo operation in accordance with the number of the layers.

24. The system of claim 16, further comprising:

calculators for calculating a degree of error of the demodulated data, respectively;

a storage section for storing the demodulated data if the degree of error is within a threshold value; and combiners for code-combining the data of the same information source read out from the storage section and re-transmitted data if the degree of error is within the threshold value, and providing the combined data to the first decoders as their inputs.

25. The system of claim 16, further comprising:

a storage section for storing the demodulated data if the degree of error of the corresponding data is within the threshold value;

decision sections for deciding whether the demodulated data is newly transmitted data or re-transmitted data; and combiners for code-combining previously received data of the same information source read out from the storage section and re-transmitted data if the data is the re-transmitted data as a result of decision by the decision sections, and providing the combined data to the first decoders as their inputs.

26. The system of claim 25, wherein the re-transmitted data includes redundancy bits of the stored data.

27. A system for transmitting and receiving a signal through a plurality of layers in a mobile communication system comprising:

first encoders for separating by layers and primarily encoding input data for an independent signal generation;

a first interleaver for interleaving in space and time the primarily encoded data of the respective layers;

a transmitter including second encoders for secondarily encoding an output of the first interleaver, the transmitter transmitting the secondarily encoded data through a plurality of antennas after it applies a code for transmission diversity to the secondarily encoded data;

calculators for calculating a degree of error of the data which is received from the transmitter, separated into the respective layers, and then demodulated;

storage sections for storing the demodulated data if the degree of error is within a threshold value;

combiners for code-combining the data of a same information source read out from the storage sections and re-transmitted data if the degree of error is within the threshold value, and providing the combined data to first decoders as their input;

the first decoders for primarily decoding the provided combined data using extrinsic information of the corresponding layers;

a deinterleaver for deinterleaving in space and time the primarily decoded data;

second decoders for secondarily decoding the deinterleaved data;

a second interleaver for interleaving in space and time the secondarily decoded data, and providing the interleaved data as the extrinsic information; and a receiver including a decision section for deciding combined values of the secondarily decoded data generated from the extrinsic information provided by a predetermined number of times when the first decoders, the deinterleaver, the second decoders, and the second interleaver perform their iterative operations for the predetermined number of times.

28. A system for transmitting and receiving a signal in a mobile communication system that transmits and receives the signal through a plurality of layers comprising:

first encoders for separating by layers and encoding input data for an independent signal generation;

a first interleaver for interleaving in space and time the primarily encoded data of the respective layers;

a transmitter including second encoders for secondarily encoding an output of the first interleaver, the transmitter transmitting the secondarily encoded data through a plurality of antennas after it applies a code for transmission diversity to the secondarily encoded data;

a storage section for storing the data which is received from the transmitter, separated into the respective layers, and then demodulated if a degree of error of the data is within a threshold value;

decision sections for deciding whether the demodulated data is newly transmitted data or re-transmitted data;

combiners for code-combining a previously received data of a same information source read out from the storage section and the re-transmitted data if the demodulated data is the re-transmitted data as a result of the decision, and providing the combined data to first decoders as their input;

the first decoders for primarily decoding the provided combined data using extrinsic information of the corresponding layers;

a deinterleaver for deinterleaving in space and time the primarily decoded data;

second decoders for secondarily decoding the deinterleaved data;

a second interleaver for interleaving in space and time the secondarily decoded data, and providing the interleaved data as the extrinsic information; and a receiver including a decision section for deciding combined values of the secondarily decoded data generated from the extrinsic information provided by a predetermined number of times when the first decoders, the deinterleaver, the second decoders, and the second interleaver perform their iterative operations for the predetermined number of times.

* * * * *